United States Patent [19]

Dubois

[11] Patent Number: 5,090,197
[45] Date of Patent: Feb. 25, 1992

[54] PIVOTING DOOR CASCADE THRUST REVERSER

[75] Inventor: Claude A. G. Dubois, Honfleur, France

[73] Assignee: Societe Anonyme Dite Hispano Suiza, Saint Cloud Cedex, France

[21] Appl. No.: 568,885

[22] Filed: Aug. 17, 1990

[30] Foreign Application Priority Data

Aug. 23, 1989 [FR] France .................... 89 1155

[51] Int. Cl.[5] ................................ F02K 1/70
[52] U.S. Cl. ................... 60/226.2; 239/265.27; 239/265.29
[58] Field of Search .............. 60/226.27; 239/265.27, 239/265.29, 265, 33; 244/110 B, 12.5

[56] References Cited

U.S. PATENT DOCUMENTS

| | | | |
|---|---|---|---|
| 3,036,431 | 5/1962 | Vdolek | 60/229 |
| 3,483,702 | 12/1969 | Ward | 60/226.2 |
| 3,511,055 | 5/1970 | Timms | 60/229 |
| 3,601,992 | 8/1970 | Maison | 60/226.2 |
| 3,605,411 | 9/1971 | Maison et al. | 60/226.2 |
| 4,410,152 | 10/1983 | Kennedy et al. | 244/110 |
| 4,485,970 | 12/1984 | Fournier et al. | 239/265.29 |
| 4,894,985 | 1/1990 | DuBois et al. | 60/226.2 |
| 4,922,713 | 5/1990 | Barbarin et al. | 60/226.2 |

FOREIGN PATENT DOCUMENTS

| | | |
|---|---|---|
| 2559838 | 3/1985 | France . |
| 1181746 | 4/1970 | United Kingdom . |
| 2045179A | 1/1980 | United Kingdom . |

OTHER PUBLICATIONS

French Search Report.

*Primary Examiner*—Richard A. Bertsch
*Assistant Examiner*—Howard R. Richman
*Attorney, Agent, or Firm*—Bacon & Thomas

[57] ABSTRACT

A thrust reverser for a turbofan-type turbojet engine is disclosed having first and second thrust reverser doors pivotably attached to the turbojet housing. The outer door is pivotably attached to the housing so as to pivot about a fixed axis extending generally transversely to the longitudinal axis of the housing. The inner thrust reverser door pivots about a second axis, extending generally parallel to the first pivot axis, which axis is also capable of moving along a translational path in a direction generally parallel to the longitudinal axis. An actuator is connected to both the inner and outer thrust reverser doors such that they are simutaneously moved between their closed and opened positions. The inner thrust reverser door pivots abouts its pivot axis as it is being moved to its open position as the pivot moves along a translational path from one end of the path to the other end. When fully opened, the inner thrust reverser door acts as a blocker panel to block off the cold-flow air duct and to direct the air laterally through an opening in the housing. A cascade structure located across the opening has a plurality of vanes to direct the air forwardly, thereby providing a thrust reversing force.

9 Claims, 3 Drawing Sheets

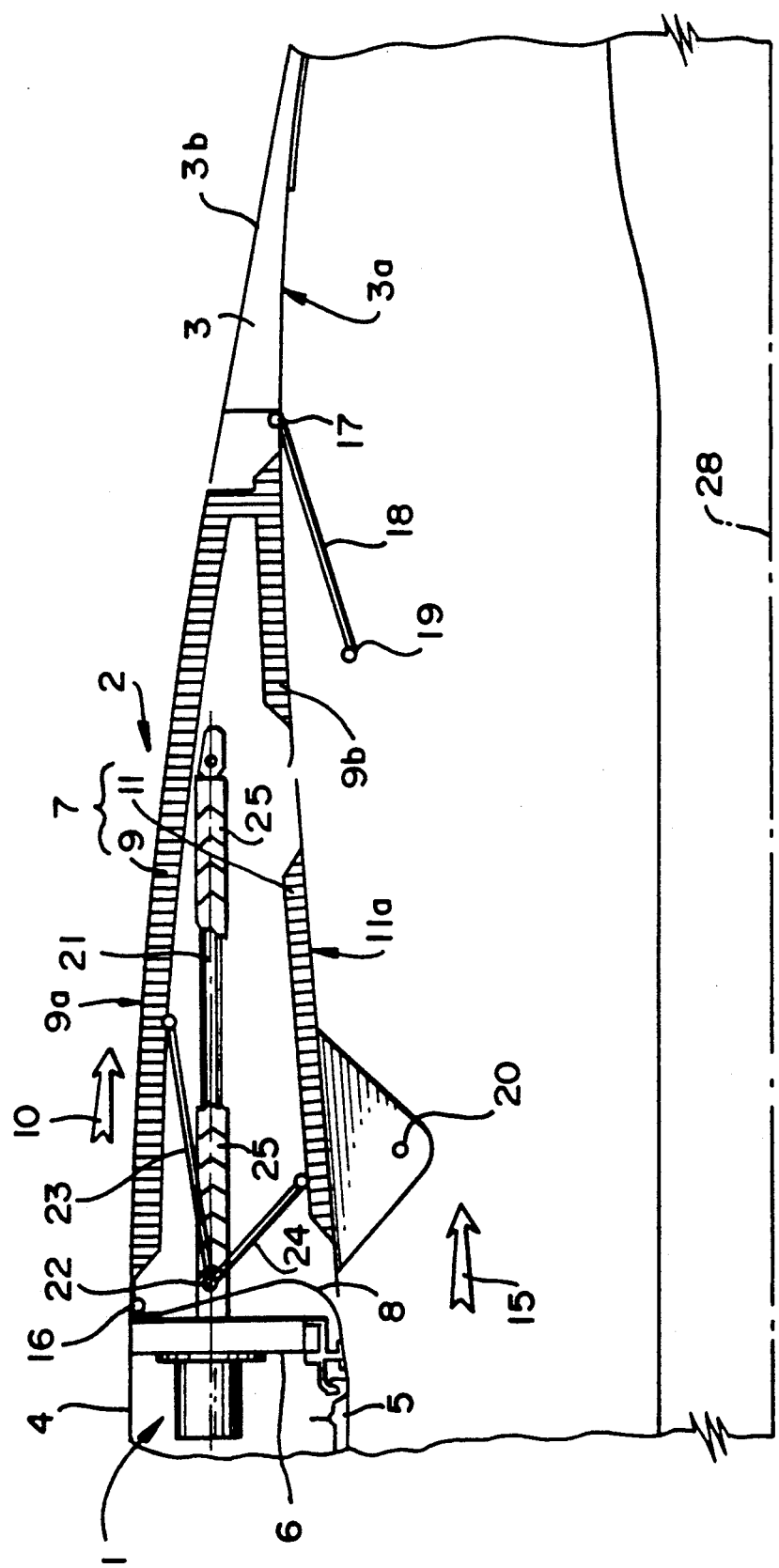

PIVOTING DOOR CASCADE THRUST REVERSER

BACKGROUND OF THE INVENTION

The present invention relates to a thrust reverser for a turbofan-type turbojet engine in which pivotable thrust reverser doors direct the flow of air through a cascade structure to provide thrust reversing forces.

Turbofan-type turbojet engines are well known in the art and, typically, comprise an annular housing concentrically arranged around the tubojet engine housing to define an annular cold-flow air duct extending along the longitudinal axis of the engine. A fan, driven by the turbojet engine, is usually located in the upstream portion of the cold-flow air duct to force air through the duct and augment the thrust of the tubojet engine.

In such turbofan-type turbojet engines having a relatively high bypass ratio, a thrust reversing device may by associated with the annular housing to redirect the air passing through the cold-flow air duct to provide a thrust reversing force. It is known to provide one or more pivotable thrust reversing doors in the annular housing to redirect the cold-flow air through one or more lateral openings in the housing.

A cross-sectional view of a typical prior art installation is illustrated in FIG. 1. The structure comprises an upstream annular housing portion 1, a thrust reverser 2 and a downstream annular housing portion 3. The upstream housing portion 1 comprises an outer surface panel 4 and an inner surface panel 5 interconnected by a frame structure 6. Similarly, downstream housing portion 3 has an inner surface panel 3a and an outer surface panel 3b.

The thrust reverser 2 comprises a pivotable door 7 and an actuator 7a extending between the door 7 and the frame structure 6. The actuator 7a, which may be a hydraulic cylinder, is attached to the frame structure 6 and has an extendible and retractable rod attached to pivoting door 7.

The door 7 extends between upstream housing portion 1 and downstream housing portion 3 so as to normally cover a generally laterally facing opening defined by the housing when the turbofan engine operates in the forward thrust mode. In this mode, as illustrated in FIG. 1, the outer door panel 9 is substantially flush with the outer surface panel 4 and the outer downstream surface panel 3b to provide a smooth air flow (indicated by arrow 10) over the exterior of the housing.

The piston rod of the actuating cylinder 7a is connected to the internal structure 12 of the thrust reverser door 7. Internal structure 12 interconnects the outer door panel 9 with the inner door panel 11, which panels are also connected at their upstream edges by baffle member 13.

In known fashion, extension of the piston rod of actuator 7a causes the door 7 to pivot with respect to the housing such that its upstream end portion swings outwardly while its downstream end portion swings inwardly to block off the air flow 15 flowing through the cold-flow air duct. The air is redirected by the door outwardly through the lateral opening in the annular housing to provide a thrust reversing force. When the door is in the open, thrust-reversing position, deflection edge 8, extending from the inner housing panel 5, minimizes the turbulence of the air passing outwardly through the opening. Baffle member 13 imparts a forward vector to the air passing through the lateral opening to increase the efficiency of the thrust reverser. In order to achieve the maximum efficiency, baffle member 13 must extend beyond the surface of the inner door panel 11.

When the door is in its closed position, as illustrated in FIG. 1, an internal cavity 16 is formed, bounded by the inner door panel 11, the extending portion of the baffle member 13, the deflection edge 8 and a theoretical air flow line 14 extending between the inner surface panel 5 and the inner surface 3a of the downstream housing portion 3. Line 14 represents the ideal theoretical air flow through the cold-flow air duct. The presence of cavity 16 causes disturbances in the air flow 15, thereby reducing the efficiency of the device in the forward thrust mode.

Typical examples of such known thrust reversing systems may be found in U.S. Pat. Nos. 4,410,152 and 4,485,970 as well as French Patent 2,559,838 and British Patent 1,181,746.

Various systems have been proposed to eliminate the presence of cavity 16, while still maintaining the efficiency of the baffle member 13. Such systems have included movable baffle members, as well as inner door panels which move relative the outer door panel as the door is moved between its opened and closed positions. While these systems have achieved a modicum of success, they inherently result in a thrust reversing door system of undesired complexity.

U.S. Pat. No. 3,605,411 discloses a thrust reverser door having an inner panel and an outer panel wherein the inner panel is movable with respect to the outer panel. When the thrust reverser door is in its closed position, the inner panel generally follows the theoretical air-flow line between the upstream and downstream portions. When in its open position, the inner door panel pivots through a greater angle such that its upstream portion is closer to the outer panel when opened than when closed. French Patent 2,638,207 also describes a thrust reverser having a pivotable door wherein an external door panel and an internal door panel are connected to each other and are movable with respect to each other.

The aforementioned French Patent 2,559,838 describes a pivoting thrust reverser door having an upstream baffle to direct the flow of thrust reversing gases in a particular direction. While generally successful, this particular type of thrust reverser door has been unable to provide the directional control to the thrust reversing gases necessary in a turbofan-type turbojet engine mounted in the tail of an aircraft. When mounted in this position, it is imperative that the thrust reversing gases be controlled so as to not impinge upon the aircraft control surfaces.

SUMMARY OF THE INVENTION

A thrust reverser for a turbofan-type turbojet engine is disclosed having first and second thrust reverser doors pivotably attached to the turbofan housing. The outer door is pivotably attached to the housing so as to pivot about a fixed axis extending generally transversely to the longitudinal axis of the housing. The inner thrust reverser door pivots about a second axis, extending generally parallel to the first pivot axis, which axis is also capable of moving along a translational path in a direction generally parallel to the longitudinal axis. An actuator, which may be a ball-nut and screw actuator, is connected to both the inner and outer thrust reverser doors such that they are simultaneously moved between their closed and opened positions.

In the closed or forward thrust position, the outer thrust reverser door is generally flush with the outer surface of the housing to provide an aerodynamic air-flow over the housing exterior. The inner thrust reverser door extends generally along a theoretical air-flow line between an upstream housing portion and a downstream housing portion so as to minimize the disturbances in the air passing through the turbofan duct defined by the housing. The outer thrust reverser door has a downstream inner panel which also extends along the theoretical air-flow line between the inner thrust reverser door and the downstream housing portion.

When moved to their opened, or reverse thrust positions, the outer thrust reverser door pivots about its fixed pivot axis such that an upstream edge portion moves outwardly while a downstream edge portion moves inwardly into the cold-flow air duct. The location of the pivot axis is such that the forces acting on the door are substantially balanced on either side of the pivot axis.

The inner thrust reverser door pivots about its pivot axis as it is being moved to its open position as the pivot axis moves along a translational path from one end of the path to the other end. When fully opened, the inner thrust reverser door acts as a blocker panel to block off the cold-flow air duct and to direct the air laterally through an opening in the housing. A cascade structure located across the opening has a plurality of vanes to direct the air forwardly, thereby providing a thrust reversing force.

The thrust reverser according to the invention provides an improved control over the direction of the thrust reversing gases rendering it particularly aplicable to those tuborfan-type tubojet engines mounted in the tail of an aircraft. By properly orienting the cascades and locating the thrust reverser doors, the direction of the thrust reversing gases can be controlled so as to not impinge upon the aircraft control surfaces.

BRIEF DESCRIPTION OF THE DRAWINGS

FIG. 2a is a partial, longitudinal cross-sectional view illustrating the thrust reverser according to the present invention with the thrust reverser doors in their closed or forward thrust positions.

DETAILED DESCRIPTION OF THE PREFERRED EMBODIMENT

Figure 1:
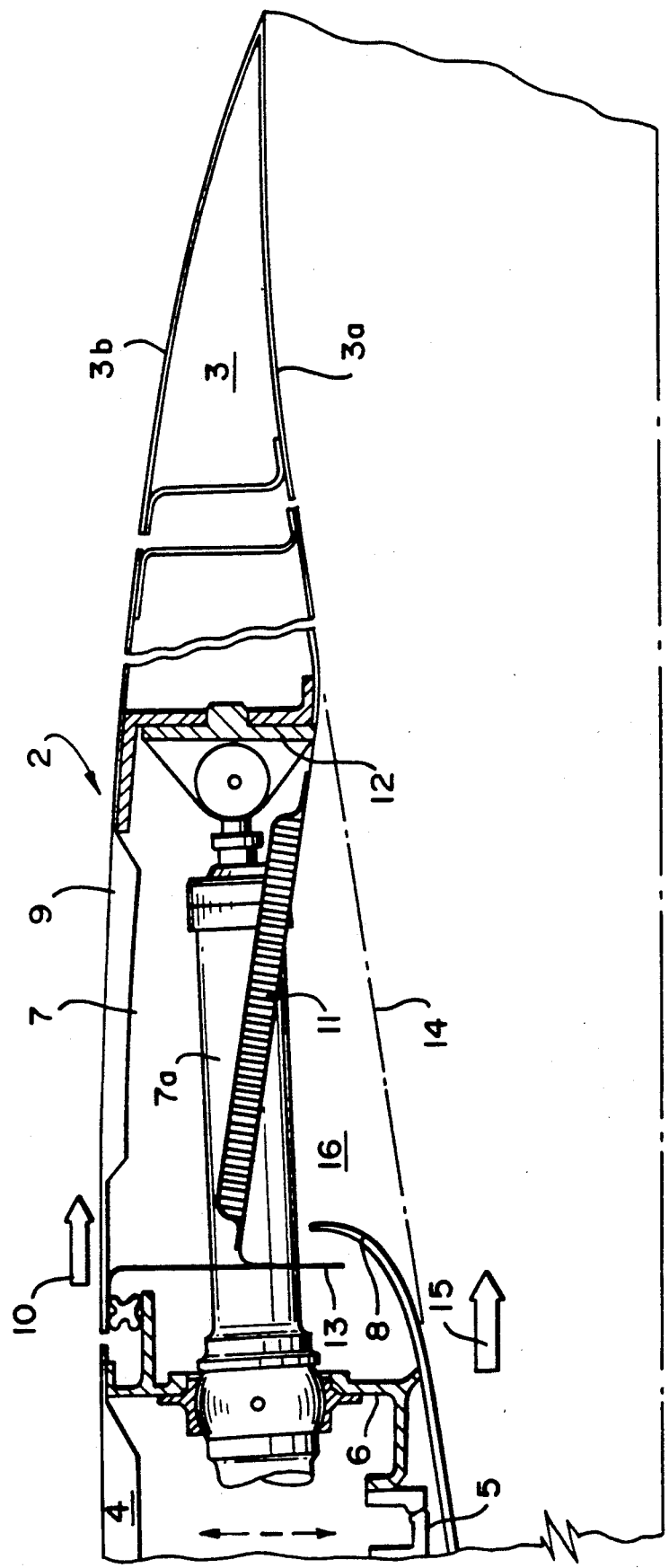
FIG. 1 is a partial, longitudinal cross-sectional view illustrating a thrust reverser of the known type with the thrust reverser door in its closed or forward thrust position.
Figure 2B:
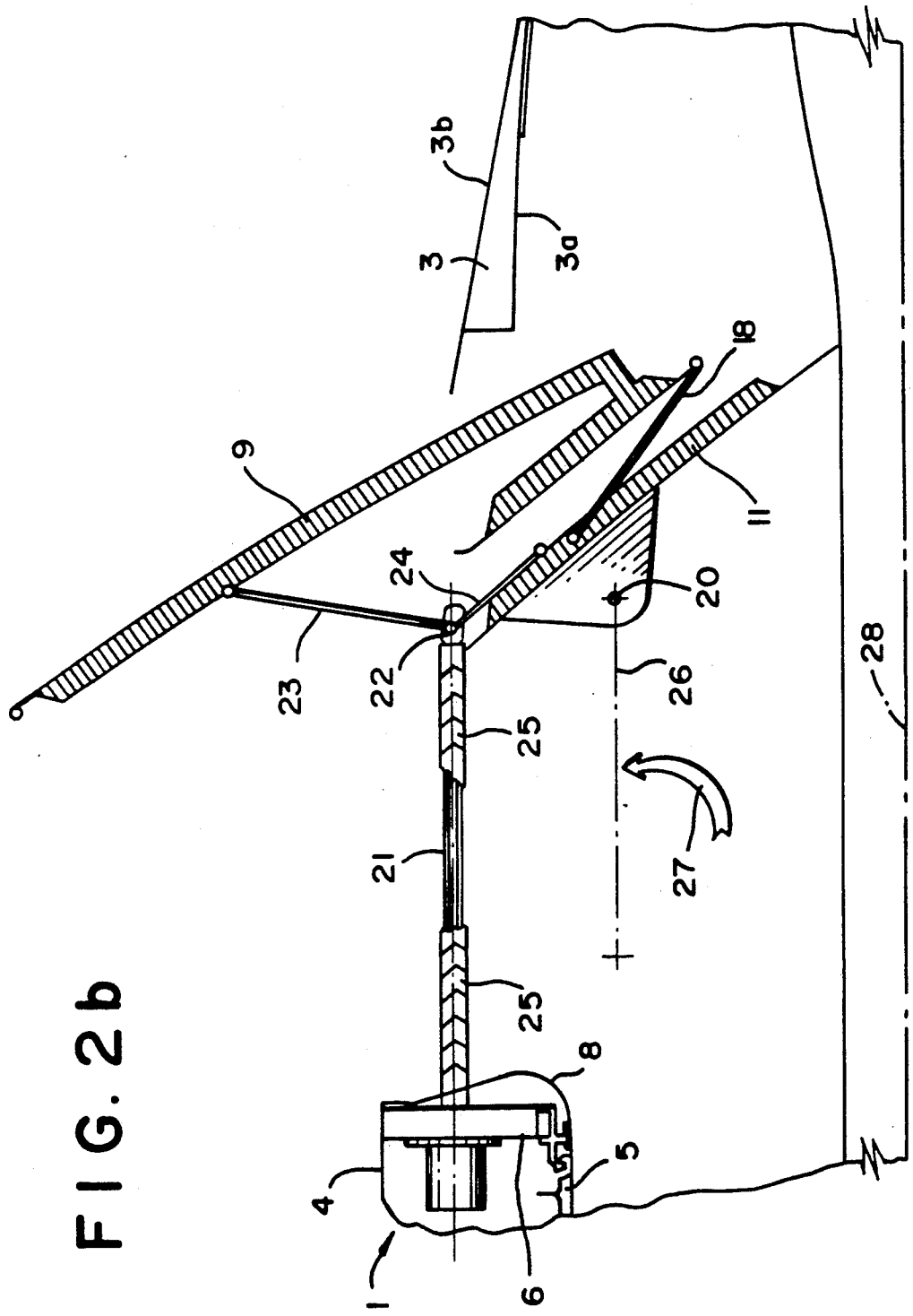
FIG. 2b is a longitudinal, cross-sectional view similar to FIG. 2a, but illustrating the thrust reverser doors in their opened or reverse thrust positions.

The thrust reverser according to the present invention is illustrated in FIGS. 2a and 2b in the closed or forward thrust positions and the opened or reverse thrust positions, respectively. The elements illustrated in FIGS. 2a and 2b similar to those described in regard to the known prior art illustrated in FIG. 1 have been given the same numerals. The thrust reverser has an upstream annular housing 1, a thrust reverser 2 and a downstream annular housing portion 3. The upstream housing portion 1 comprises an outer surface panel 4 and an inner surface panel 5 interconnected by frame structure 6. Downstream housing portion 3 has an inner surface panel 3a and an outer surface panel 3b. The housing defines an outer boundary for a cold-flow air duct through which the air passes in the direction of arrow 15 from an upstream section (toward the left as viewed in FIGS. 2a and 2b) toward a downstream end (toward the right as viewed in FIGS. 2a and 2b).

The thrust reverser 7 comprises a first, outer thrust reverser door 9 having an outer door surface 9a and being pivotally attached to the housing so as to pivot about axis 19 extending generally transversely to the longitudinal axis of the housing 28. The connection of the first thrust reverser door 9 to the housing so as to pivot about axis 19 is schematically illustrated by element 18. It is believed that such connections are well-known in the art and any such connection may be utilized with this invention as long as first thrust reverser door 21 may pivot about stationary axis 19.

Second or inner thrust reverser door 11 is also pivotally attached to the housing so as to pivot about axis 20 extending generally parallel to fixed axis 19. Thrust reverser door 11 has inner surface 11a facing toward the interior of the cold-flow air duct. When in its closed position, as illustrated in FIG. 2a, surface 11a extends generally along the theoretical air-flow line between the upstream inner surface panel 5 toward the downstream inner surface panel 3a. Outer thrust reverser door 9 has a downstream portion 9b which, when the door is in its closed position as illustrated in FIG. 2a, continues along this theoretical air-flow line between the down stream edge of inner thrust reverser door 11 and inner downstream surface 3a.

When the thrust reverser doors are in their closed positions, as illustrated in FIG. 2a, seals 16 and 17 prevent the air passing through to the cold-flow air duct from passing outwardly between the outer thrust reverser door and the upstream and downstream housing structures. Thus, as can easily be seen, the thrust reverser in its closed or forward thrust operating mode presents an aerodynamically clean surface on the exterior of the housing as well as a smooth air-flow surface facing toward the interior of the cold-flow air duct.

A linear actuator, which may be a ball-screw actuator of any known type, is attached to the frame structure 6. The linearly movable element 22 of the actuator 21 is connected to the outer thrust reverser door 9 by link rod 23 and to the inner thrust reverser door 11 by link rod 24. In order to move the thrust reverser doors from their closed positions to their opened positions, the actuating element 22 is moved along the actuator 21 to the position, illustrated in FIG. 2b. Such motion causes the outer thrust reverser door 9 to pivot about its fixed axis 19 such that its upstream edge is moved outwardly from the housing and its downstream edge is moved inwardly into the cold-flow air duct as illustrated in FIG. 2b.

Movement of the actuating element 22 causes the inner thrust reverser door 11 to pivot about its axis 20 and also causes the axis 20 to move along the translational path 26 as illustrated in FIG. 2b. In its opened position, inner thrust reverser door 11 blocks at least a portion of the air in the cold-flow air duct so as to direct it generally in a lateral direction, indicated by arrow 27.

A cascade structure 25 having a plurality of air-flow directing vanes extending across the cascade structure in the known fashion is located accross the opening defined by the housing on either side of the actuator 21. The vanes of the cascade structure 25 direct the air in generally upstream direction (toward the left as illustrated in FIG. 2b) to provide the thrust reversing forces.

By properly locating the thrust reverser doors and by properly orienting the vanes of the cascade structure, the invention provides a more precise control of the direction of the thrust reverser gases. Therefore, the present invention finds particular application for tail mounted turbojet engines and may be used to direct the thrust reversing gases so as to not affect the control surfaces of the aircraft.

The foregoing description is provided for illustrative purposes only and should not be construed as in any way limiting this invention, the scope of which is defined solely by the appended claims.

I claim:

1. A thrust reverser for a turbojet engine having a housing extending along a longitudinal axis and defining at least one generally laterally facing opening, an upstream outer housing surface and an upstream inner housing surface located upstream of the generally laterally facing opening, and a downstream outer housing surface and a downstream inner housing surface located downstream of the generally laterally facing opening, the upstream and downstream inner housing surfaces defining a boundary of a gas flow stream, the thrust reverser comprising:
   a) a first thrust reverser door;
   b) first means pivotally attaching the first thrust reverser door to the housing so as to pivot about a fixed, first axis between a closed forward thrust position wherein the first thrust reverser door covers the generally laterally facing opening, and an open, reverse thrust position wherein the first thrust reverser door uncovers the generally laterally facing opening;
   c) a second thrust reverser door located radially inwardly of the first thrust reverser door in a direction toward the longitudinal axis;
   d) second means pivotally attaching the second thrust reverser door to the housing so as to pivot about a second axis extending generally parallel to the first axis, the second means enabling the second axis to move along a translational path such that the second thrust reverser door is movable between a first forward thrust position wherein the second axis is located at one end of the translational path and the second thrust reverser extends generally parallel to the gas flow stream, and a second, reverse thrust position wherein the second axis is located at an opposite end of the translational path and the second thrust reverser door deflects at least a portion of the gas flow stream toward the generally laterally facing opening;
   e) actuator means;
   f) linkage means connecting the actuator means with the first and second thrust reverser doors such that the actuator means pivots the first and second thrust reverser doors in the same direction about their respective axes between their closed and open positions; and,
   g) a cascade structure extending substantially over the generally laterally facing opening so as to direct the gas flow passing through the opening in a generally forward direction.

2. The thrust reverser according to claim 1 wherein the first and second pivot axes extend generally perpendicular to the longitudinal axis of the housing.

3. The thrust reverser according to claim 1 wherein the actuator comprises a linear actuator having an actuating element movable in a direction generally parallel to the longitudinal axis of the housing.

4. The thrust reverser according to claim 3 wherein the linkage means comprises:
   a) a first link rod connecting the actuator element and the first thrust reverser door; and,
   b) a second link rod connecting the actuator element and the second thrust reverser door.

5. The thrust reverser according to claim 1 wherein the second pivot axis and the translational path of travel are located such that the second thrust reverser door is generally flush with the upstream inner housing surface when in its closed, forward thrust position.

6. The thrust reverser according to claim 1 wherein the first pivot axis is located such that the first thrust reverser door is generally flush with the upstream and downstream outer housing surfaces when in its closed, forward thrust position.

7. The thrust reverser according to claim 1 wherein the first and second thrust reverser doors are spaced apart in a direction generally transverse to the longitudinal axes when in their closed, forward thrust positions and wherein the cascade structure is located between the first and second doors.

8. The thrust reverser according to claim 1 wherein the first means pivotally attaching the first thrust reverser door to the housing locates the first pivot axis such that the forces acting on the first thrust reverser door when in its open, reverse thrust position are generally balanced on either side of the first pivot axis.

9. The thrust reverser according to claim 1 wherein the first thrust reverser door further comprises a downstream inner panel portion located such that it is generally flush with the downstream inner housing surface and an inner surface of the second thrust reverser door when the first thrust reverser door is in its closed, forward thrust position.

* * * * *

UNITED STATES PATENT AND TRADEMARK OFFICE
CERTIFICATE OF CORRECTION

PATENT NO. : 5,090,197

DATED : February 25, 1992

INVENTOR(S) : Dubois

It is certified that error appears in the above-identified patent and that said Letters Patent is hereby corrected as shown below:

On the title page, item [57],

In the Abstract, line 3, delete "turbojet" and insert --turbofan--.

Signed and Sealed this

Second Day of November, 1993

Attest:

BRUCE LEHMAN

*Attesting Officer*  *Commissioner of Patents and Trademarks*